US006600489B2

(12) United States Patent
Cook

(10) Patent No.: US 6,600,489 B2
(45) Date of Patent: Jul. 29, 2003

(54) SYSTEM AND METHOD OF PROCESSING DIGITAL TERRAIN INFORMATION

(75) Inventor: Stephen R. Cook, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 231 days.

(21) Appl. No.: 09/737,271

(22) Filed: Dec. 14, 2000

(65) Prior Publication Data

US 2002/0101419 A1 Aug. 1, 2002

(51) Int. Cl.[7] .............................................. G06T 15/50
(52) U.S. Cl. ...................... 345/426; 345/420; 345/421; 345/589; 345/601
(58) Field of Search ................................ 345/426, 427; 340/995

(56) References Cited

U.S. PATENT DOCUMENTS

| | | | | |
|---|---|---|---|---|
| 4,876,651 A | * | 10/1989 | Dawson et al. ............. 340/995 |
| 5,179,638 A | * | 1/1993 | Dawson et al. ............. 345/427 |
| 5,299,300 A | | 3/1994 | Femal et al. ................. 395/128 |
| 5,748,194 A | * | 5/1998 | Chen ............................ 345/427 |
| 5,798,765 A | * | 8/1998 | Barclay ....................... 345/426 |
| 6,229,525 B1 | * | 5/2001 | Alexander ................... 345/157 |
| 6,483,504 B1 | * | 11/2002 | Deering ....................... 345/419 |

* cited by examiner

Primary Examiner—Joseph Mancuso
Assistant Examiner—T. Russell Green, III
(74) Attorney, Agent, or Firm—Allen, Dyer, Doppelt, Milbrath & Gilchrist, P.A.

(57) ABSTRACT

In a mapping system using a graphics application programming interface, for every digital terrain elevation data post, a normal to the terrain surface is calculated, which is then encoded in a half-polar coordinate system. The tilt and azimuth are represented as two fixed-point integers and a color table containing the illumination colors, such as gray scale colors, are given a particular azimuth and tilt combination. The two-dimensional color table array is collapsed into a single-dimensional array by concatenating (linking together) the azimuth and tilt into a single integer. The azimuth will be the most significant position. During rendering, the graphic subsystem converts the color table.

28 Claims, 15 Drawing Sheets

PLAN-VIEW DTED DISPLAY

"EXPLODED" DTED PLAN VIEW

COMPOSITE DTED PLAN VIEW

TEXTURE MAPPING EXAMPLE

EXTREMELY DENSE POLYGONAL MESH

DENSE REGULAR GRID WITH AVERAGE SURFACE NORMALS

FLAT-SHADED TIN

FLAT-SHADED TIN (ROUGHER APPROXIMATION OF SURFACE)

AVERAGE SURFACE NORMAL

TIN WITH GOURAUD SHADING

LARGE AREA TIN WITH GOURAUD SHADING

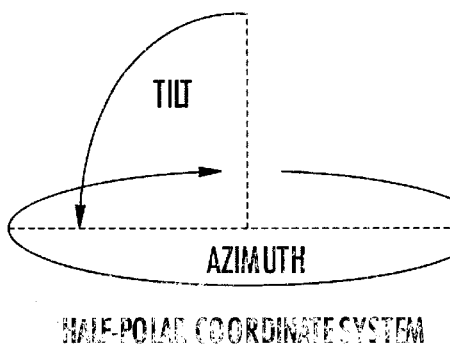
FIG. 12.
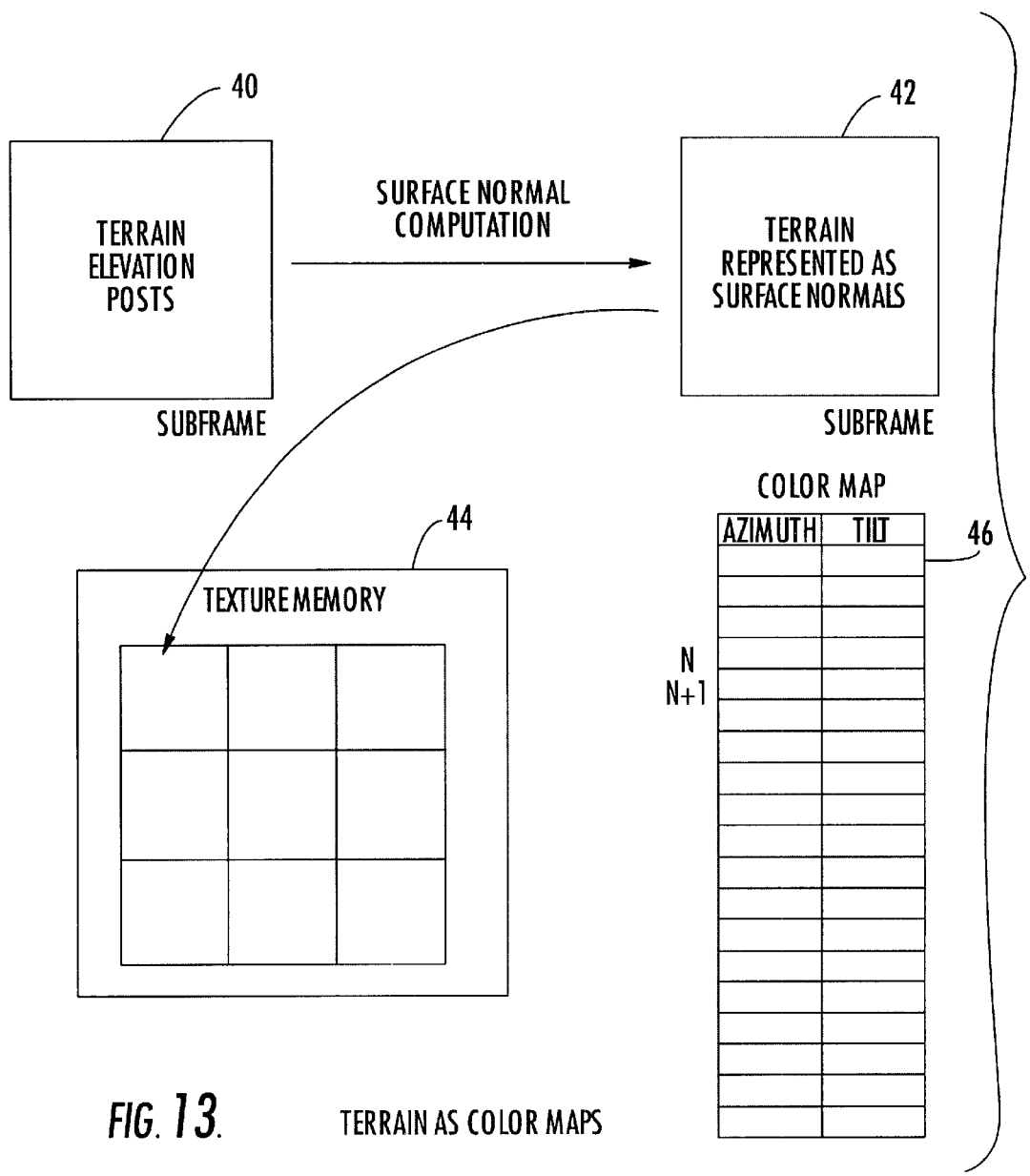
FIG. 13.    TERRAIN AS COLOR MAPS

MANIPULATING THE COLOR MAP TABLE

| AZIMUTH | | | | | TILT | | |
|---|---|---|---|---|---|---|---|
| 4 | 3 | 2 | 1 | 0 | 2 | 1 | 0 |

FIG. 15.

| AZIMUTH | | | | | TILT | | |
|---|---|---|---|---|---|---|---|
| 0 | 1 | 0 | 0 | 0 | 1 | 0 | 1 |

SYSTEM AND METHOD OF PROCESSING DIGITAL TERRAIN INFORMATION

FIELD OF THE INVENTION

This invention relates to terrain map displays, and more particularly, this invention relates to a system and method for processing and creating digital terrain elevation data plan-view maps relying on a graphics application programming interface (API).

BACKGROUND OF THE INVENTION

Digital map generation and display systems access and display digital terrain map images effectively in real time with the travel of an aircraft, helicopter or other object over terrain. One factor in the ability of the system to effect a real time display is to use the combination of scene memory for storing a portion of digital map imagery data from a mass storage device in a prescribed orientation, such as north-up, and a controlled addressing scheme for reading the data from scene memory for displaying the image in accordance with the heading information supplied by an aircraft's on-board navigation equipment. U.S. Pat. No. 5,299,300 issued Mar. 29, 1994 to Femal et al., the disclosure which is hereby incorporated by reference in its entirety, discloses a hardware embodiment of interpolation processing of digital map imagery data that retrieves full and half resolution data stored in half-resolution addresses.

The advent of commercial off-the-shelf (COTS) graphics hardware, such as driven by advanced and sophisticated PC game markets, has placed pressure on custom avionics market place to use COTS graphics hardware and software. The avionics community, however, requires high fidelity digital terrain elevation data map displays. Under a commercial off-the-shelf graphics application programming interface, such as the OpenGL, a terrain is modeled with a series of polygons and a lighting model is used to illuminate the terrain providing the relief image. For example, an OpenGL image, as an example, can use a half-a-million polygons in one image. The polygons could be triangles where the corner of each triangle includes an elevation post and particular coordinates for the post. Every triangle and its coordinates are sent through the OpenGL or other COTS application programming interface (API). A processor calculates the surface angle and slope based on the received coordinates and determines where the sun is located.

This use of a large number of polygons requires a large memory and processor bandwidth to create the imagery, which is also required to rotate, i.e., translate and zoom, at rates of a minimum of 20 Hz. Maintaining a plan-view digital terrain elevation data display via conventional, commercial off-the-shelf methods requires significant processing capability, as noted above. These terrain displays are generated via polygonal meshes and use the lighting model. They are bandwidth intensive and processor heavy, and are not as desirable if a more simple and efficient solution could be found.

SUMMARY OF THE INVENTION

The present invention is advantageous because it is now no longer necessary to create a polygonal mesh and lighting model that is used, in turn, to create a plan-view digital terrain elevation data display. The present invention advantageously uses a bit-mapped image, texture map, where each pixel value corresponds to a color in a color map, such as a gray scale image color map. By careful construction of these two items, it is possible to create a three-dimensional relief map that can have a moving sun-angle without expensive calculations. For every digital terrain elevation data post, a normal is calculated relative to the terrain surface. This value is encoded in a half-polar coordinate system with tilt and azimuth, which are represented as two fixed-point integers. A color (gray scale as one example) table is created and contains the illumination colors given a particular azimuth and tilt combination. The native two-dimensional color table array is "collapsed" into a single-dimensional array by concatenating (link together), the azimuth and tilt into a single integer, where azimuth will be in the most significant position.

The color index/color pallet mode of an application programming interface is used for the grid of single-value surface normals that become a texture. During rendering, the color table is used by the graphic subsystem to convert the "color index" into an RGB color.

When the heading angle of the map changes, the result is a simple change in azimuth. To avoid any optical illusion problem, the virtual sun must appear to remain in the upper left corner of the display. Because the map imagery is rotated, the illumination angle of the sun is counter-rotated, compensating for the map rotation. The counter-rotating movement of the sun-angle can be accomplished by shifting the values in the color table. Instead of using a hardware application, the present invention manipulates digital terrain elevation data such that the effect caused by some prior art hardware devices are performed with a graphics application programming interface, which lowers the bandwidth by orders of magnitude, freeing up resources for other features. The applications can include airborne digital maps, mission planning systems and geospatial/cartographic systems.

BRIEF DESCRIPTION OF THE DRAWINGS

Other objects, features and advantages of the present invention will become apparent from the detailed description of the invention which follows, when considered in light of the accompanying drawings in which:

FIG. 12 illustrates a diagram of a half-polar coordinate system used in the present invention.

FIG. 13 illustrates the computation of surface normal and the use of texture memory and a color map.

FIGS. 15 and 16 are examples of azimuth/tilt values.

DETAILED DESCRIPTION OF THE PREFERRED EMBODIMENTS

Figure 1A:
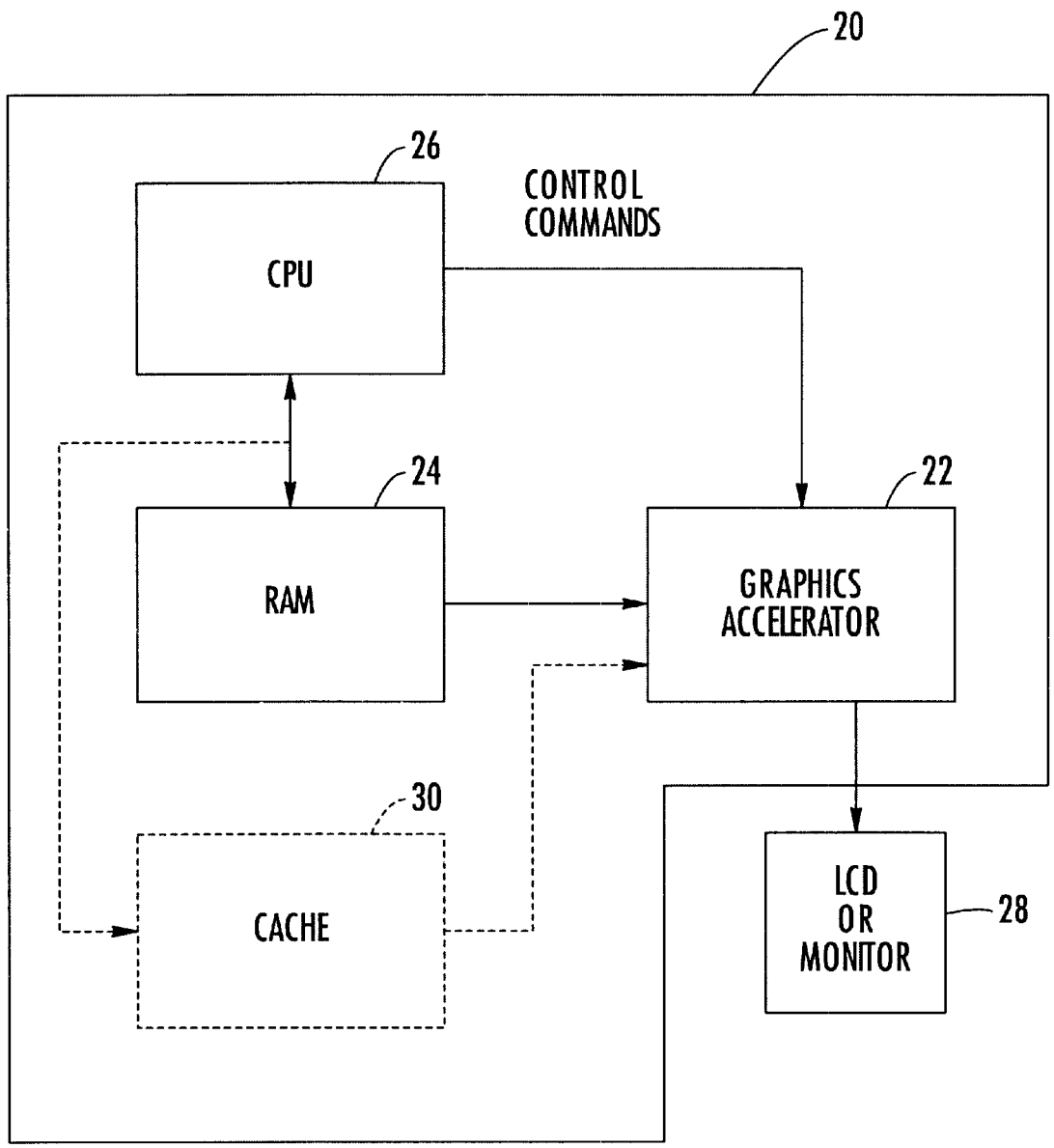
FIG. 1A is a block diagram of basic components of a memory/cache architecture, as an example of a system that is used in the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous and provides an enhanced and alternative method for creating digital terrain elevation data plan-view maps on an airborne digital mapping system. The system of the present invention uses a graphics application programming interface, such as a commercial off-the-shelf OpenGL API. Instead of creating a normal polygonal mesh, and using a lighting model to create the plan view digital terrain elevation data display, the present system and method uses a texture map in the form of a bit-mapped image. Each pixel value corresponds to a color in a color map, such as a gray scale image color map. By carefully constructing these two items, it is possible to create a three-dimensional relief map that has a moving sun-angle without expensive calculations.

For every digital terrain elevation data post, a normal to the terrain surface is calculated and encoded in a half-polar coordinate system. The tilt and azimuth are represented as two, fixed-point integers. A color table contains the illumination colors (such as the gray scale image colors) and are given a particular azimuth and tilt combination. The native two-dimensional color table array is "collapsed" into a single-dimensional array by concatenating (linking together) the azimuth and tilt into a single integer where the azimuth will be located in the most significant position.

The color index/color pallet mode of an application programming interface is used with a grid of a single-value surface normal becoming a texture. During rendering, the color table can use the graphics subsystem to convert the "color index" into a RGB color.

When the heading angle of a map changes, the result is a change in azimuth. To avoid the optical illusion problem, the virtual sun can appear to remain in the upper left corner of the display. Because the mapped imagery is rotated, the illumination angle of the sun must appear counter-rotated, compensating for the map rotation. This counter-rotating movement of the sun-angle can be accomplished by shifting the value in the color table.

The system and method of the present invention is advantageous over prior art hardware specific approaches. With the present invention, the data is manipulated such that the effect rendered by hardware devices is performed with a graphics application programming interface. The present system and method lowers the bandwidth by orders of magnitude, freeing up resources for other features and can be advantageously used for airborne digital maps, mission planning systems, geospatial/cartographic systems, and other systems known to those skilled in the art.

Figure 1B:
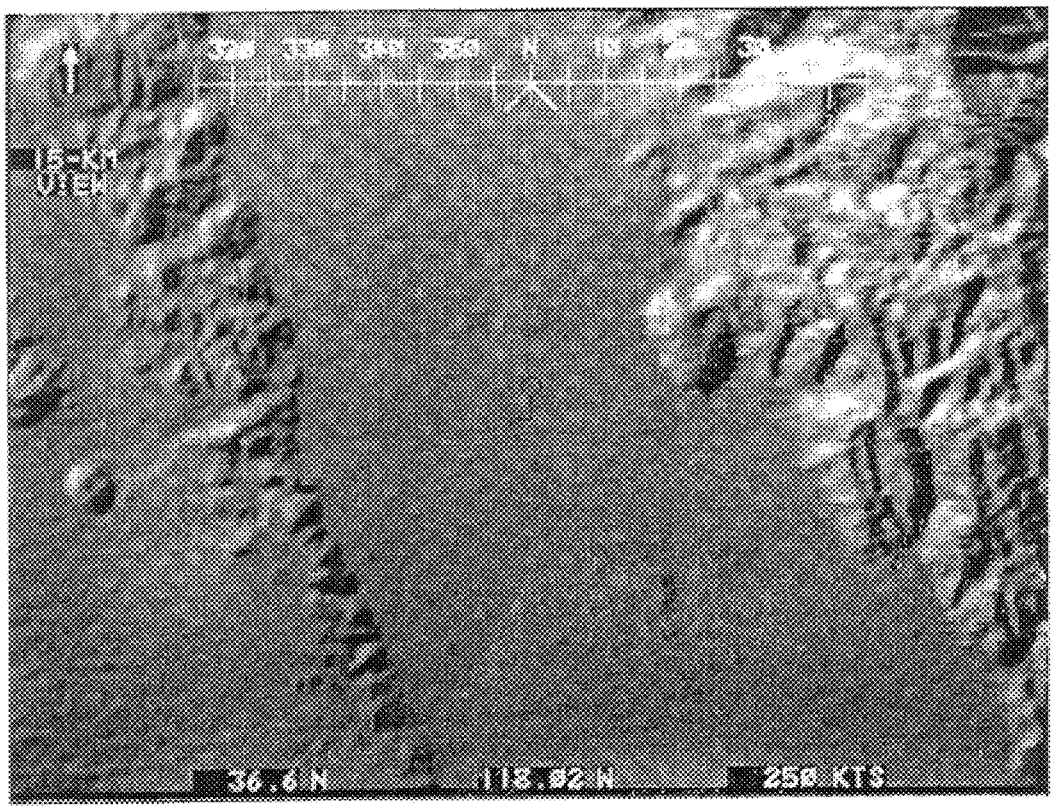
FIG. 1B is a plan-view of a typical digital terrain elevation data display taken from an aircraft.

FIG. 1 illustrates a computer system shown at 20 that uses a unified memory architecture, as an example only. A graphics accelerator 22 accesses map data from a random access memory (RAM) 24. Data and control commands are input to the graphics accelerator from CPU 26. Two-dimensional images are displayed on an LCD 28 or other similar display. It is possible to use a texture or other cache 30 (indicated by dashed lines) where the fill rate could be higher from the cache and from the main memory of the unified memory system such as with the cache architecture.

Any graphics hardware architecture can be hidden by the software layer, called the graphics application programming interface (API). Although different programming interfaces can be used in accordance with the present invention, one preferred application programming interface is an industry standard API called OpenGL, which provides a common interface to graphics functionality on a variety of hardware platforms. OpenGL also provides a uniform interface to the various mapping capabilities, such as texture mapping capabilities, supported by system architecture. Further details of OpenGL programming are found in Neider, Davis and Woo, OpenGL Programming Guide, Addison-Wesley, Redding, Mass., 1993.

FIG. 1 is a plan view of a sun-sloped shaped digital terrain image where the sun is representative as shining from the upper left hand corner. This type of image could be used on many different types of displays 28, including flat panel displays and other similar displays, including active matrix liquid crystal displays that are both monochrome and color. Typically, the display 28 has real time smooth and continuous map updates at different speeds and motions and provides full anti-aliasing. It has elevation color band slight height above terrain (HAT) and slope shading digital terrain elevation data (DTED) overlays with full graphics generation with continuous zoom of 0.5 to 8× and auto zone boundary compensation. A digital map generator can store terrain data to generate moving train map displays and eliminate paper maps. The displays can be either digitized representations of standard aeronautical charts or topographical displays created from digitized elevation and cultural feature data. Symbology overlays can be added to show features such as wave points, flight paths and assist with terrain-aided navigation and ground collision avoidance. Typically, the displays could be 640×480 and 1280× 480 sensor video modes that have fiber-optic video interfaces and RS-422 serial interfaces for command modes and status and use commercial display technology, as known to those skilled in the art. Various on-board processors, with both HSDB and SDDN functions, can exist on single SEM-E modules.

Figure 2:
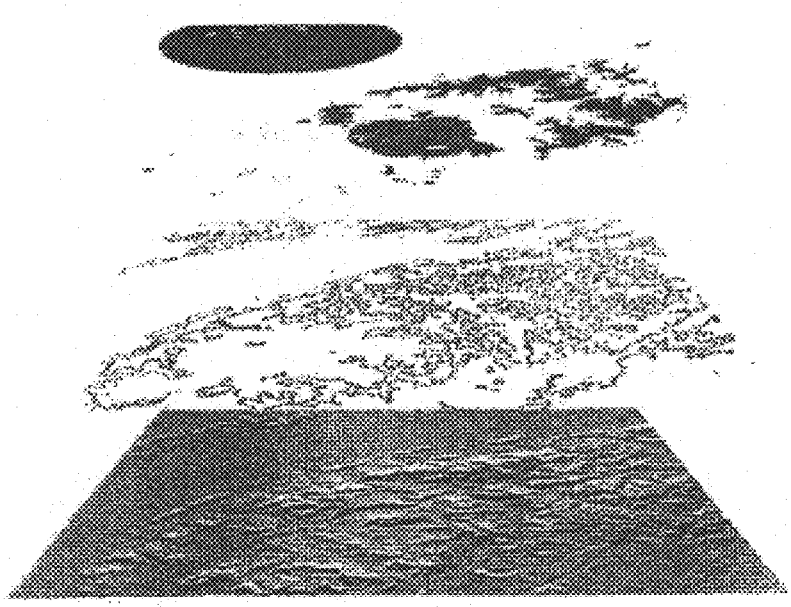
FIG. 2 is an exploded view of a digital terrain elevation data plan-view showing various unstacked layers.
Figure 3:
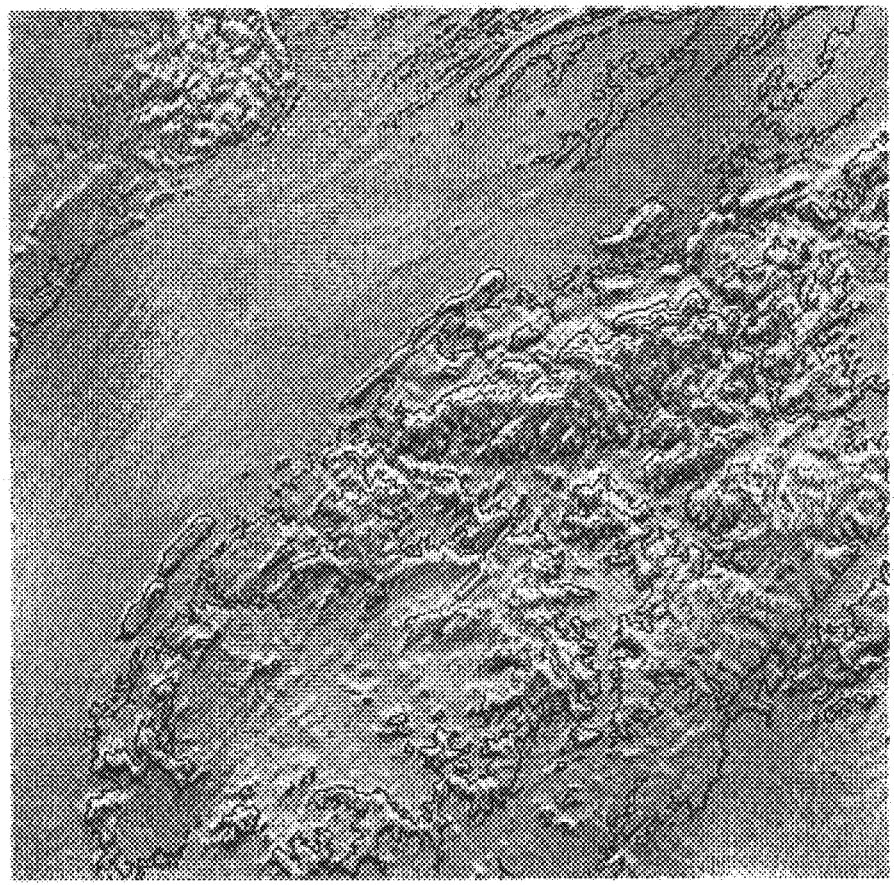
FIG. 3 is a composite digital terrain elevation data plan-view of a complete image of the unstacked layers shown in FIG. 2.

A plan view DTED display is typically composed of several "layers," which build up the display. The underlying, sun-sloped shaded terrain map, the contour lines, the translucent tint colors (elevation banding, threat intervisibility), and symbology elements are also built. The symbology elements can be disregarded and these elements can be visualized if an image is flipped over and the layers unstacked (FIG. 2), showing a complete image is composed.

Historically, digital maps have been provided that have necessitated custom image rendering hardware in order to provide DTED images that can be rotated, translated and zoomed at rates past 20 Hz. With the advent of COTS OpenGL and other graphics API hardware, it is desirable to use a COTS graphics API, such as OpenGL software standard and COTS chips for the hardware. The DTED planview display uses the highest memory bandwidth and might prove to be the most difficult mode to provide in an OpenGL setting.

Figure 4:
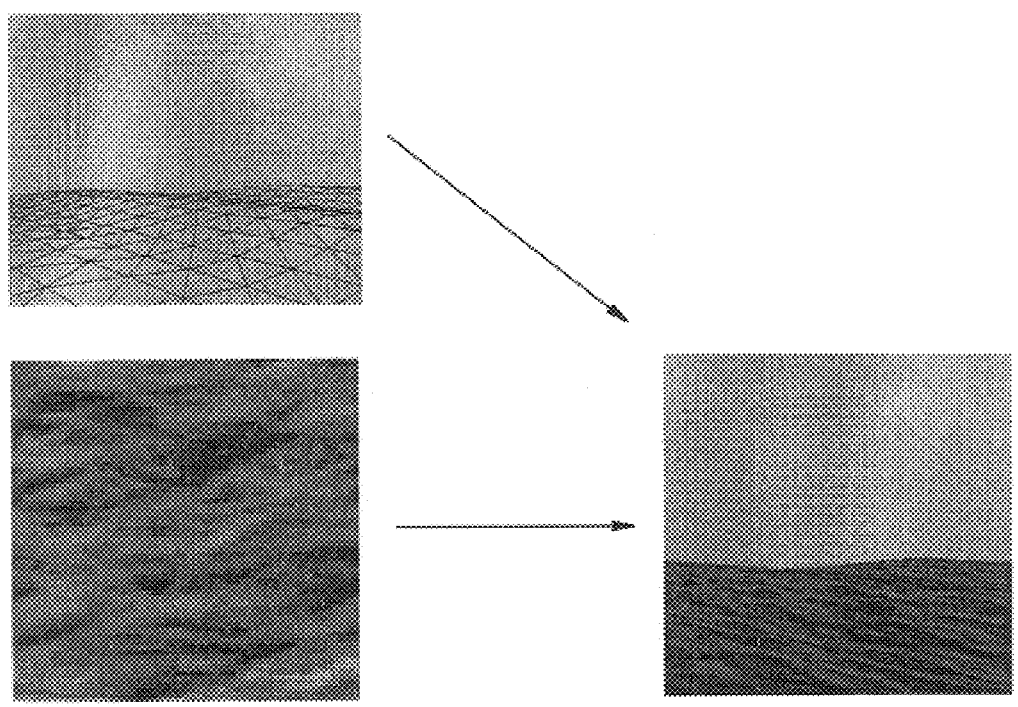
FIG. 4 is a texture mapping example of an image using a graphic application programming interface.

OpenGL and similar COTS graphics application programming interfaces provide a rich set of capabilities for rendering 3-D graphics. Typically, a scene is rendered out of polygons, which are then applied with a series of textures (i.e., photos). For example, in FIG. 4, an ocean surface is created with a polygonal surface and a texture.

Figure 5:
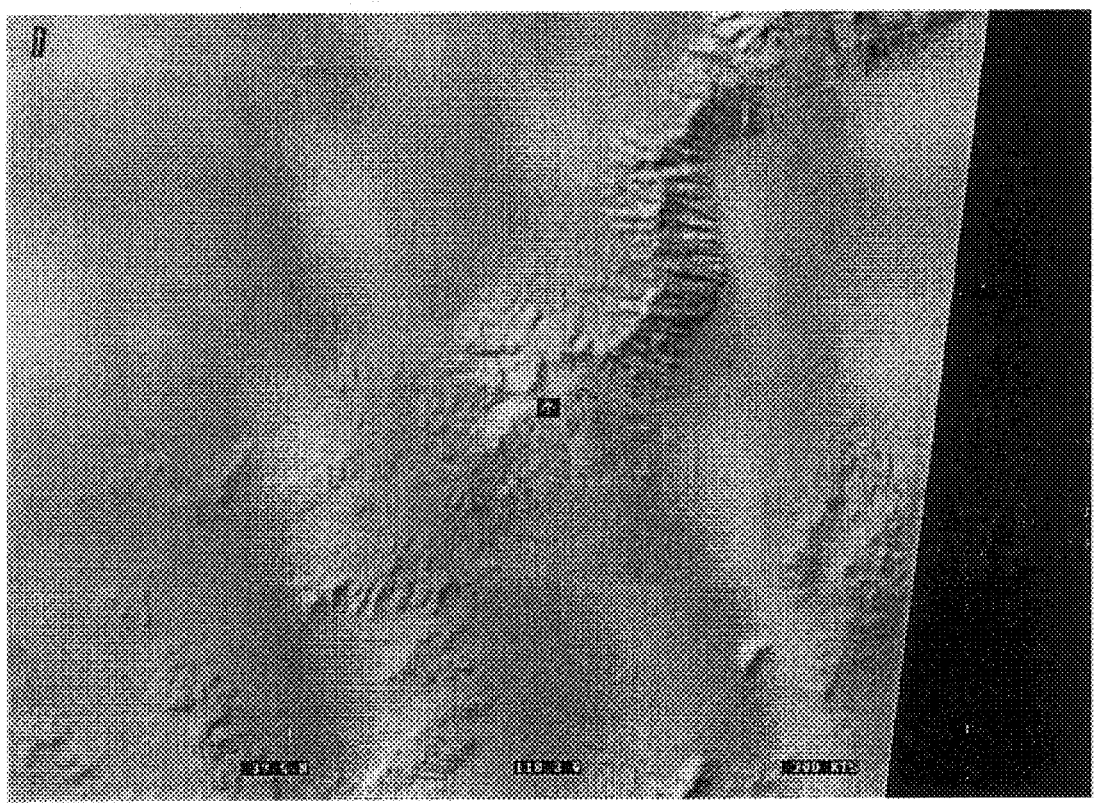
FIG. 5 is an example of an image of an extremely dense polygonal mesh created from many polygons.

In a typical sun-slope shaded display using OpenGL, it is possible to create a terrain surface and apply a shading model to illuminate the terrain. In order to have a fairly high fidelity image, a large number of polygons are used. In FIG. 5, a DTED display is rendered using approximately one million polygons. This polygonal mesh is created from a regular (equally sized) grid of triangles, directly created from the elevation mesh, similar to the example in FIG. 4. It should be emphasized that the data bandwidth necessary for this display is large because OpenGL and similar COTS graphics API's are required to compute a lighting calculation for every triangle. This calculation requires both the triangle coordinates and normal vectors.

It is possible to integrate in a Triangulated Irregular Network (TIN) optimization code into software to speed up a perspective mode. Thus, TIN can be used for a plan-view DTED mode. A TIN code is created for the purpose of a texture-mapped perspective display. TIN's reduce the number of triangles necessary to model the terrain surface.

Figure 6:
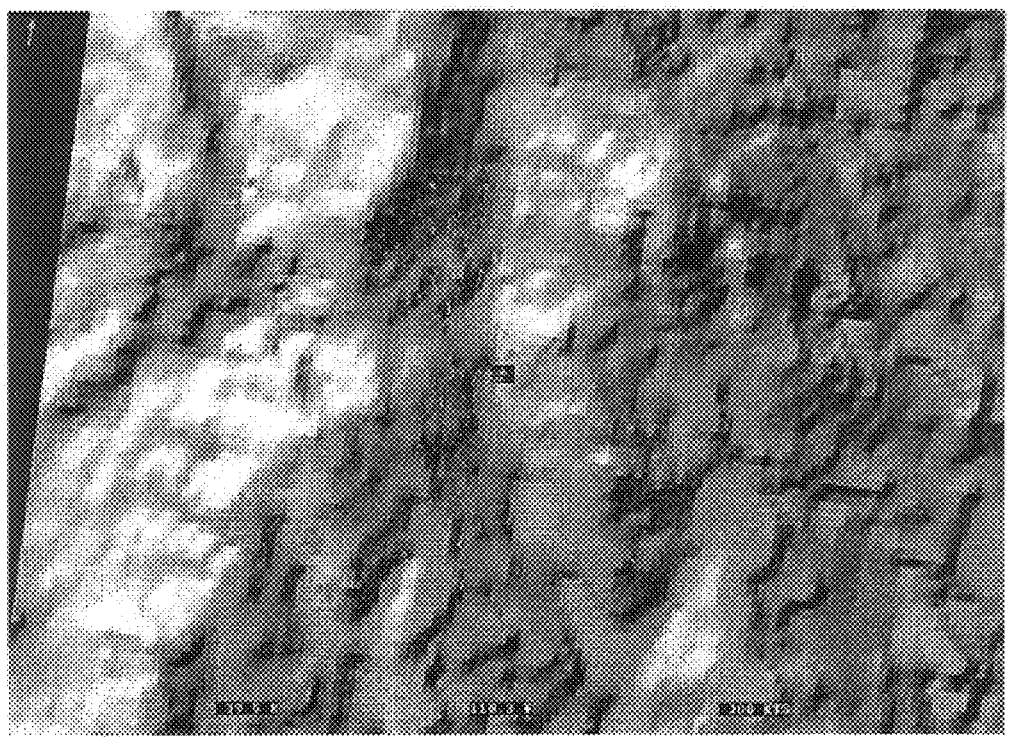
FIG. 6 illustrates an image using a dense regular grid of triangles.
Figure 7:
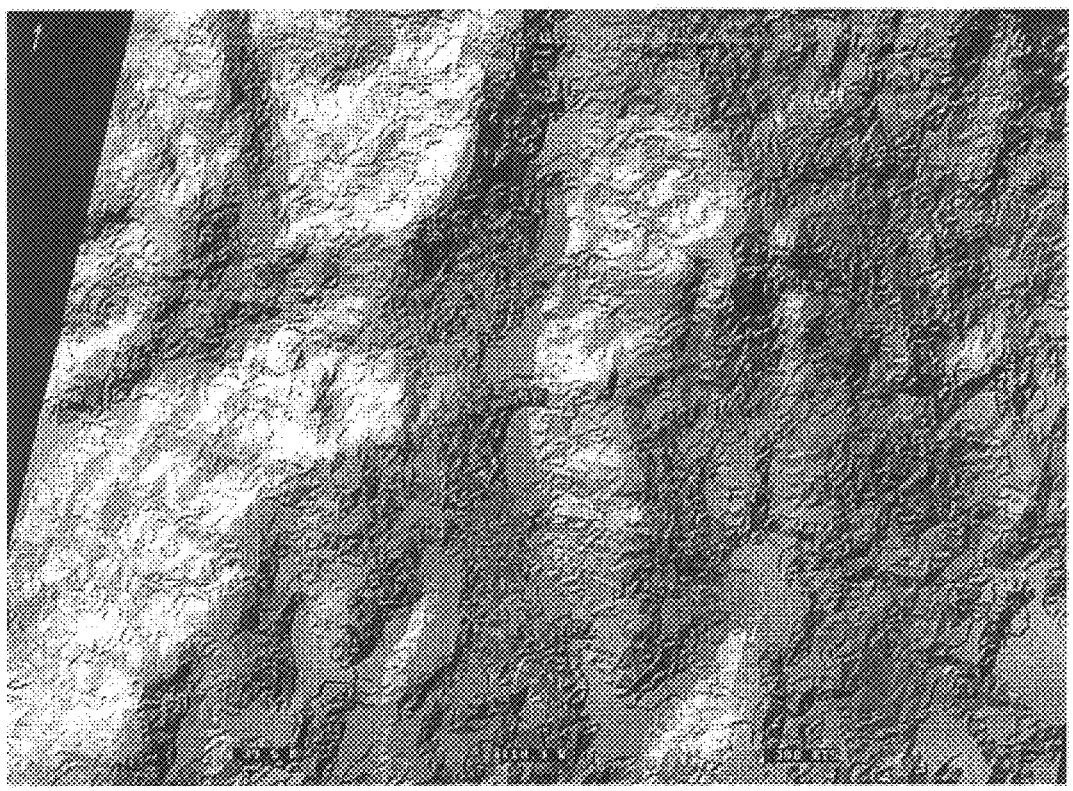
FIG. 7 illustrates an image for a triangulated irregular network that is flat-shaded.
Figure 8:
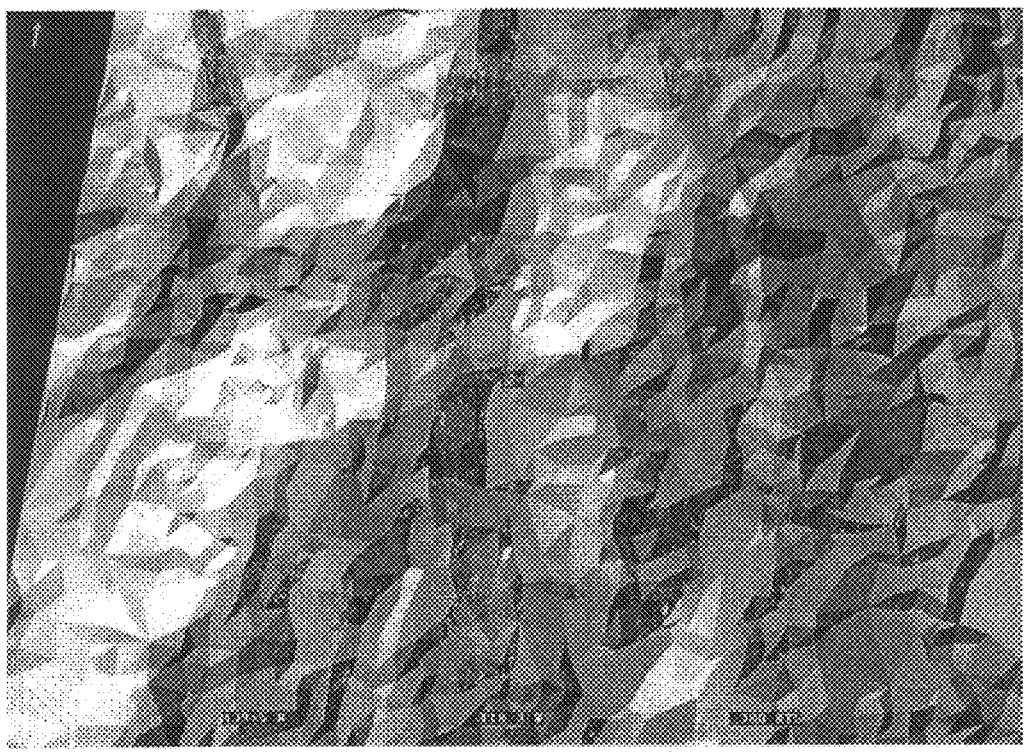
FIG. 8 illustrates an image for a flat-shaded TIN (having a rougher approximation of surface).

FIG. 6 illustrates a dense regular grid of triangles (two per four elevation posts) that use an average surface normal at each vertex. FIG. 7 illustrates a TIN that approximates the same surface, but the polygons are flat shaded, i.e., a triangle has one single color, in order to visualize the triangle mesh. FIG. 8 illustrates a TIN that has a decreased number of polygons creating a less accurate surface approximation.

Figure 9:
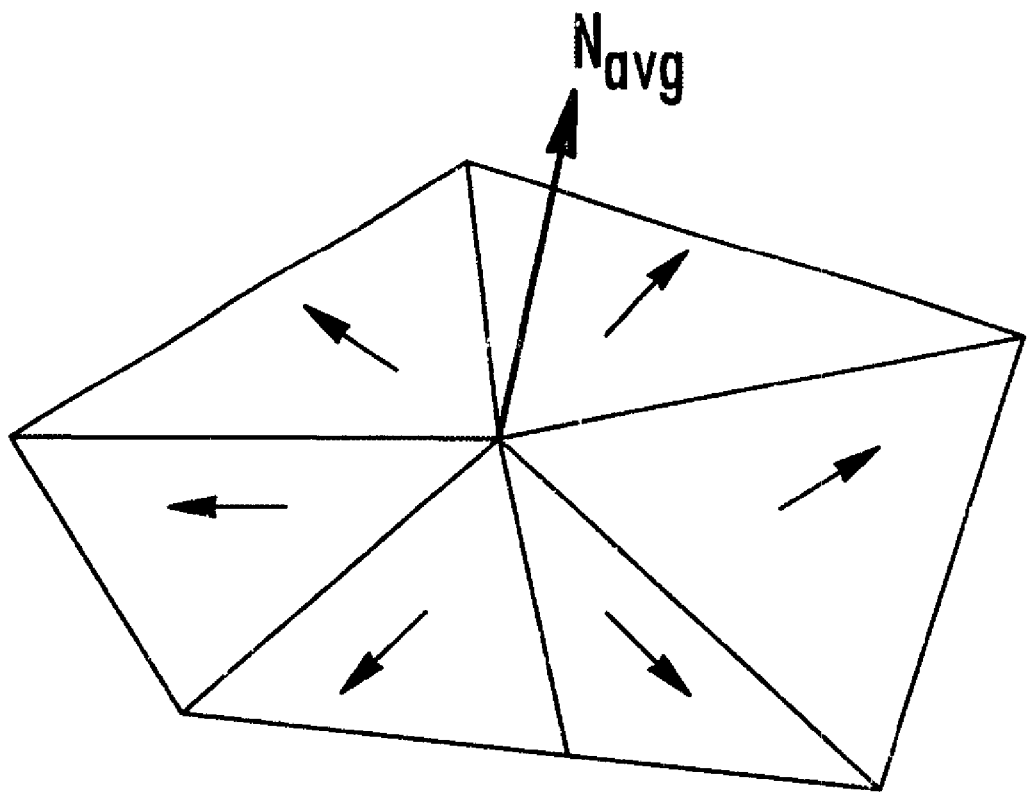
FIG. 9 illustrates an average surface normal $N_{AVG}$.

In a flat shading model, a single color is used for each facet of the terrain. This is derived from how that surface plane faces the light source, by using the normal vector to the surface. FIG. 6 shows the average surface normal, which is used for a Gouraud (smooth) shaded image. To provide an average surface normal, a normal from each surface plane incident upon the vertex is accumulated, averaged and normalized (FIG. 9). Colors, such as gray scale colors, can then be calculated at the vertices and bilinearly interpolated across the triangle facet.

Figure 10:
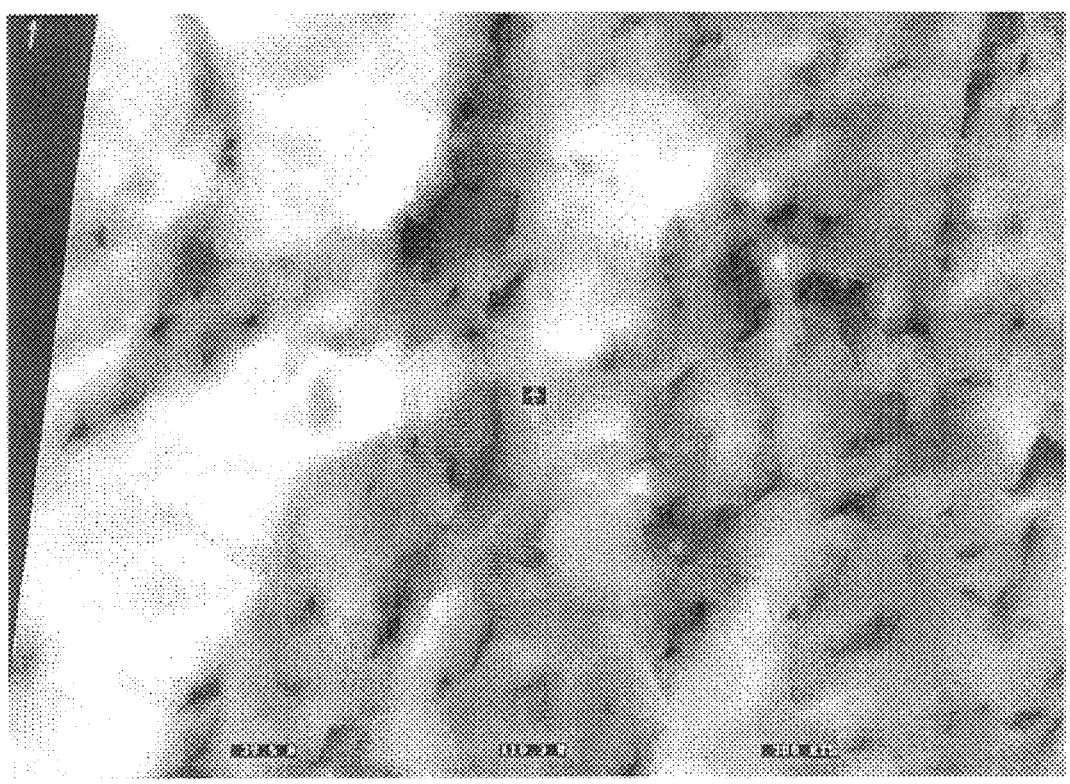
FIG. 10 illustrates a TIN image with Gouraud shading.
Figure 11:
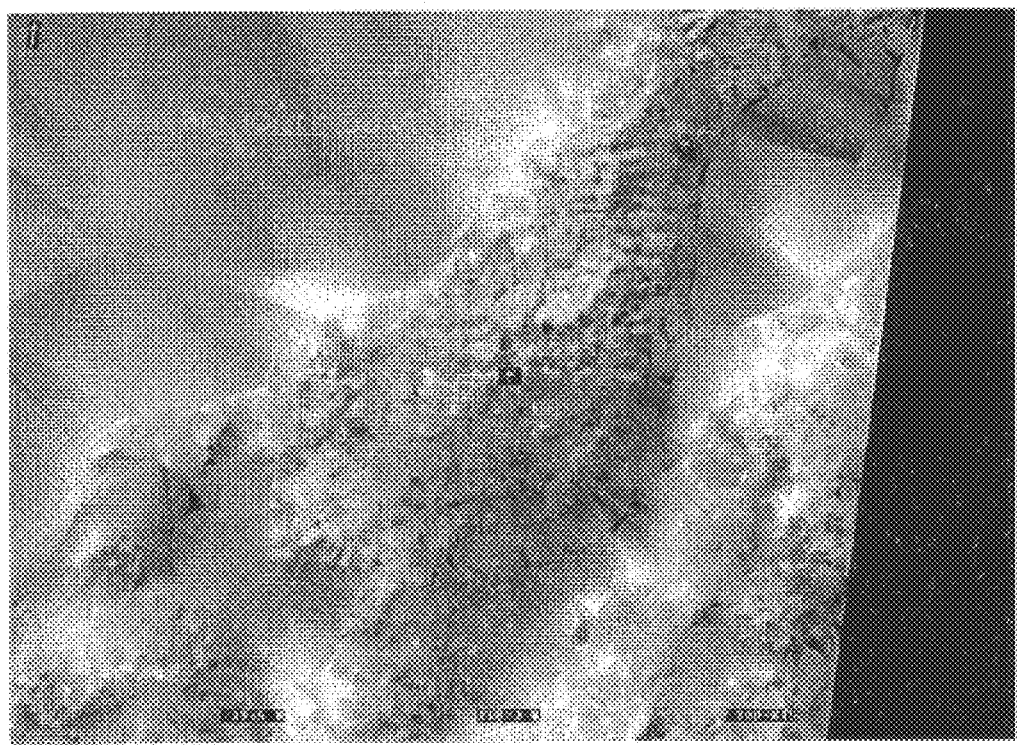
FIG. 11 illustrates a large area TIN image with Gouraud shading.

When this technique was performed upon a TIN surface, the resulting image was much less than satisfactory (FIG. 10). This poor image results from several factors. First, each surface was weighted the same, yielding a disproportional normal. Second, the surface approximation itself leads to a smoothing effect (removing high frequency variations in the surface). When viewed at the larger scale (FIG. 11), it is evident that the smooth shading will have pronounced effects upon the larger triangles (representing large flat areas of terrain). Because human eyes are sensitive to the smooth linearity of the tessellated surface, this technique cannot be used even with a weighted normal approach, which can be calculated with moment arms.

One of the advantages of the plan-view DTED display of the present invention is the position of the virtual sun. When in a heading-up mode, the virtual sun always remains in the upper left corner of the display regardless of the map rotation angle. This ensures that the resulting image presents mountains as projecting out of the display and not in the opposite manner. If it were not for this difference, most systems would have little difficulty presenting a DTED display. The system can calculate the image once, then create a texture of that image using the feedback mechanism in OpenGL or other COTS graphics API, and rotate that texture appropriately. It is possible to accomplish something similar, eliminating the job of polygonal shading.

For each "loadable" terrain block, the software will, for each post, calculate a normal to the surface. This normal, in basically a half polar coordinate system, will be composed of two elements: a slope tilt and a slope azimuth as shown in FIG. 12. These two coordinates are represented as two fixed point numbers, which are then concatenated, i.e., linked together, into a single reference integer and into a "two" dimensional table. This single reference integer will become a color index into the azimuth/tilt table. The azimuth/tilt table will be a color table containing RGB values (FIG. 13). This valuation can be advantageously accomplished in hexadecimal notation.

The example shown in FIGS. 15 and 16 illustrate how to encode an azimuth/tilt into an 8-bit integer. FIG. 15 illustrates the individual bit positions within the 8-but integer. As shown in FIG. 15, azimuth is a 5-bit number (values 0 . . . 31) with a least significant bit equal to 11.25 degrees. Tilt is a 3-bit number (values 0 . . . 7) with a least significant bit equal to 7 degrees. Angles over 49 degrees will be represented as the fixed point value of 7.

Example: Azimuth=90 degrees, tilt=35 degrees $$90 \text{ Deg} = \frac{90 \text{ Deg}}{11.25 \frac{\text{Deg}}{\text{Azimuth\_LSB}}} = 8$$

$$35 \text{ Deg} = \frac{35 \text{ Deg}}{7 \frac{\text{Deg}}{\text{Tilt\_LSB}}} = 5$$

FIG. 16 shows how these two fixed-point numbers are concatenated into the single integer value (resulting value shown in both hexadecimal "h" and decimal "d" representation).

As illustrated in FIG. 13, terrain elevation posts 40 are processed via a surface normal computation where the software computes values such that the terrain is represented as surface normals 42. This data is sent to texture memory 44 and processed into the color map 46. This will allow the software to use the OpenGL or other API color index mode. After using color index mode for the underlying map image, the software can then command the API, such as OpenGL, to switch back to RGB mode to render any information in the RGB color system. It is possible that in some individual OpenGL and other graphics API implementations, using desktop machines, the software cannot switch color modes within a single window.

Figure 14:
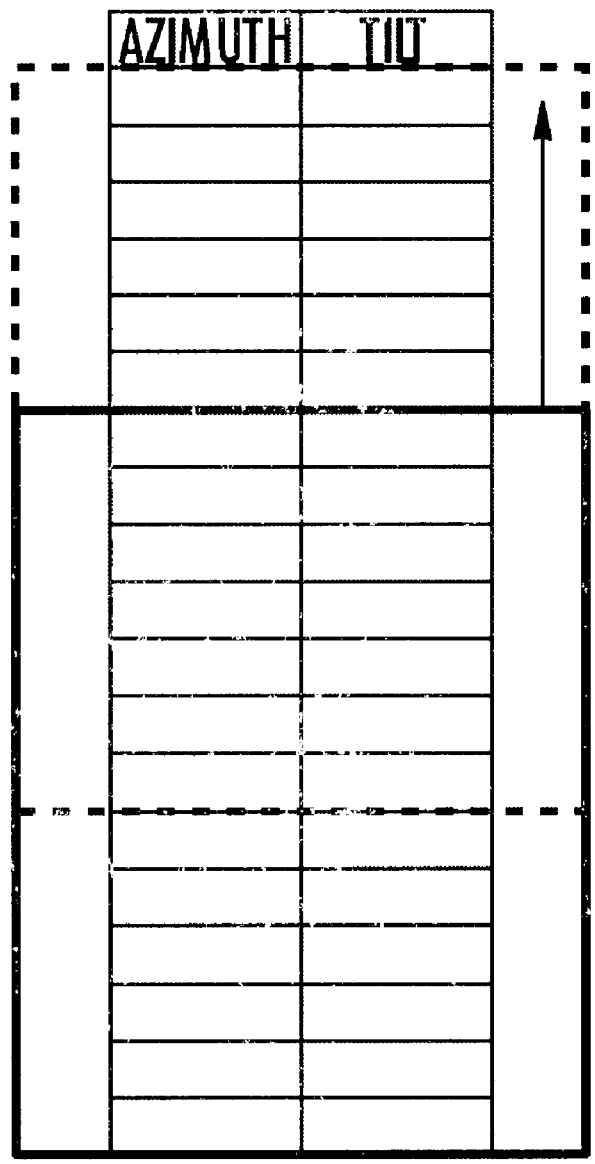
FIG. 14 illustrates how a color map table can be manipulated in accordance with the present invention.

When the heading angle of the map changes, the result is a simple change in azimuth. By applying a single offset, the "proper" colors can be indexed into the azimuth/tilt table thereby generating the correct sun-angle color. By "shifting" or otherwise manipulating the color table, the effect of changing the offset can be accomplished, and hence, the proper sun-angle shading angle will be accomplished for a particular heading value (FIG. 14). Since the manipulation of the sun-angle is done via the color map table, the software only needs to instruct the OpenGL interface to render the terrain texture map on an appropriately rotated rectangular polygon.

This method is similar to what the modular map family has done with custom software/hardware, operates solely within the guise of the graphics API such as OpenGL. There will be a large decrease in computations necessary to render the image. Typically, this is covered by the COTS OpenGL hardware chips, but there are still limitations. The bandwidth between the software and the OpenGL interface drops significantly.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method of processing digital terrain elevation data (DTED) for a digital terrain map comprising the steps of:
    obtaining digital terrain elevation data posts;
    calculating a normal relative to the terrain surface for each digital terrain elevation data post;
    forming a color table reference number used in a color table for each digital terrain elevation data post; and
    applying a single offset to each reference number in the color table for generating a correct sun-angle color when the heading angle of the digital terrain map changes.

2. A method according to claim 1, wherein the color table reference number is representative of a gray scale color.

3. A method according to claim 1, and further comprising the step of forming the color table reference number as a hexadecimal number.

4. A method according to claim 1, and further comprising the step of calculating the normal within a polar coordinate system.

5. A method according to claim 1, and further comprising the step of locating the azimuth value within the most significant position of the color table reference number.

6. A method according to claim 1, wherein the color table reference number comprises a single integer.

7. A method according to claim 1, and further comprising the step of applying a single offset to each reference number contained in the color table.

8. A method of processing digital terrain elevation data (DTED) for a digital terrain map comprising the steps of:
    processing digital terrain elevation data using a graphics application programming interface (API) to create a texture image of a plurality of terrain blocks, each terrain block having a terrain elevation data post;
    calculating a normal relative to the terrain surface for each digital terrain elevation data post;
    forming a color table reference number used in a color table for each digital terrain elevation data post; and
    applying a single offset to each reference number in the color table for generating a correct sun-angle color when the heading angle of the digital terrain map changes.

9. A method according to claim 8, wherein the color table reference number is representative of a gray scale color.

10. A method according to claim 8, and further comprising the step of forming the color table reference number as a hexadecimal number.

11. A method according to claim 8, and further comprising the step of calculating the normal within a polar coordinate system.

12. A method according to claim 8, and further comprising the step of locating the azimuth value within the most significant position of the color table reference number.

13. A method according to claim 8, and further comprising the step of applying a single offset to each reference number contained in the color table.

14. A method according to claim 8, wherein the color table reference number comprises a single integer.

15. A method of processing digital terrain elevation data (DTED) for a digital terrain map comprising the steps of:
    processing digital terrain elevation data using a graphics application programming interface (API) to create a texture image of a plurality of terrain blocks, each terrain bock having a terrain elevation data post;
    calculating a normal value relative to the terrain surface for each digital terrain elevation data post as two fixed point numbers corresponding respectively to a slope tilt value and slope azimuth value;
    concatenating the two fixed point numbers into a color table reference number for each digital terrain elevation data post;
    applying each color table reference number as part of a color index for a color table; and
    applying an offset to each reference number in the color table for generating a correct sun-angle color when the heading angle of the digital terrain map changes.

16. A method according to claim 15, wherein the color table reference number is representative of a gray scale color.

17. A method according to claim 15, and further comprising the step of forming a color table reference number as a hexadecimal number.

18. A method according to claim 15, and further comprising the step of calculating the normal within a polar coordinate system.

19. A method according to claim 15, and further comprising the step of locating the azimuth value within the most significant position of the color table reference number.

20. A method according to claim 15, and further comprises the step of applying a single offset to each color table reference number.

21. A method according to claim 15, wherein the color table reference number comprises a single integer.

22. A system for processing digital terrain elevation data (DTED) for a digital terrain map comprising:
    a graphics application programming interface for receiving and processing digital terrain elevation data and creating a texture image of a plurality of terrain blocks, each terrain block having a terrain elevation data post;
    a processor for calculating a normal relative to the terrain surface for each digital terrain elevation data post, forming a color table reference number for each post and used as an index in a color table, and applying a single offset to each reference number in the color table for generating a correct sun-angle color when the heading angle of the digital terrain map changes.

23. A system according to claim 22, wherein said color table reference number comprises a hexadecimal value.

24. A system according to claim 22, wherein said concatenated value has a most significant position corresponding to the azimuth value.

25. A system according to claim 22, wherein said color table comprises a plurality of numbers corresponding to gray scale values.

26. A method of processing digital terrain elevation data (DTED) for a digital terrain map comprising the steps of:
    obtaining digital terrain elevation data posts;
    calculating a normal relative to the terrain surface for each digital terrain elevation data post within a polar coordinate system wherein the normal comprises a slope tilt value and a slope azimuth value as two fixed point numbers that are concatenated into a color table reference number;

forming a color table reference number used in a color table for each digital terrain elevation data post; and applying an offset to each reference number in the color table for generating a correct sun-angle color when the heading angle of the digital terrain map changes.

27. A method of processing digital terrain elevation data (DTED) for a digital terrain map comprising the steps of:

processing digital terrain elevation data using a graphics application programming interface (API) to create a texture image of a plurality of terrain blocks, each terrain block having a terrain elevation data post;

calculating a normal relative to the terrain surface for each digital terrain elevation data post within a polar coordinate system wherein the normal comprises a slope tilt value and a slope azimuth value as two fixed point numbers that are concatenated into a single table reference number;

forming a color table reference number used in a color table for each digital terrain elevation data post; and applying an offset to each reference number in the color table for generating a correct sun-angle color when the heading angle of the digital terrain map changes.

28. A system for processing digital terrain elevation data (DTED) for a digital terrain map comprising:

a graphics application programming interface for receiving and processing digital terrain elevation data and creating a texture image of a plurality of terrain blocks, each terrain block having a terrain elevation data post;

a processor for calculating a normal relative to the terrain surface for each digital terrain elevation data post, forming a color table reference number as a concatenated value obtained from a slope tilt value and a slope azimuth value for each post and used as an index in a color table, and applying a single offset to each reference number in the color table for generating a correct sun-angle color when the heading angel of digital terrain map changes.

* * * * *